June 3, 1969     G. SHIPMAN     3,447,843
SEAL DEVICE
Original Filed July 6, 1964
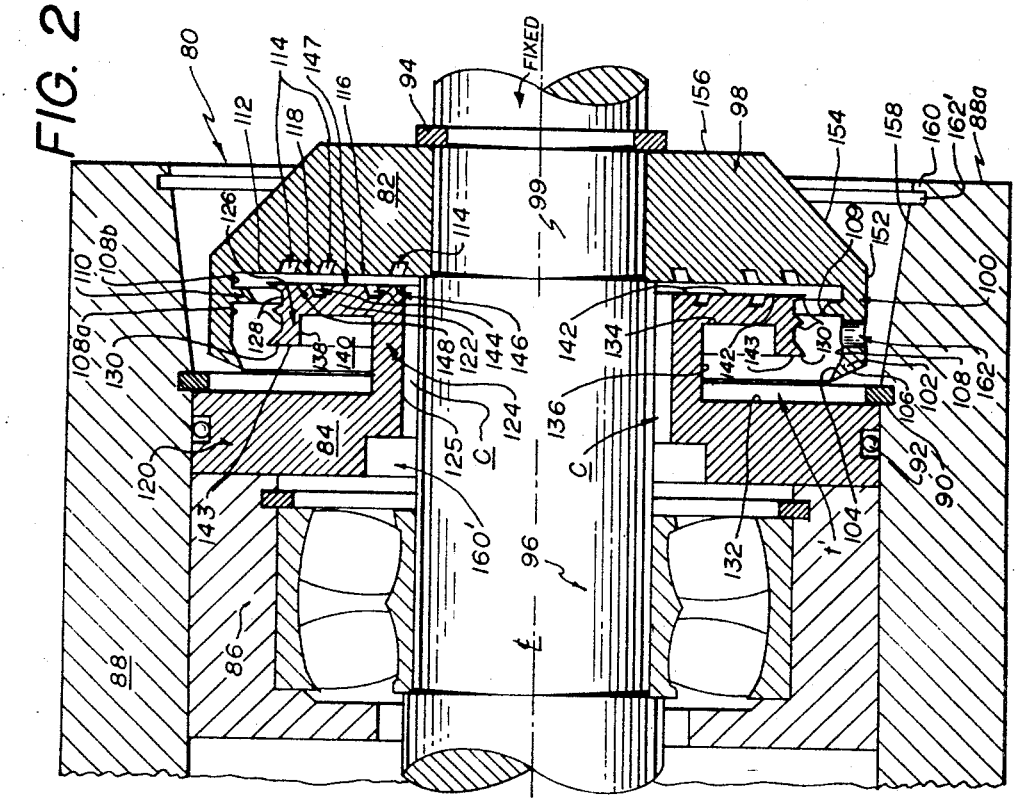
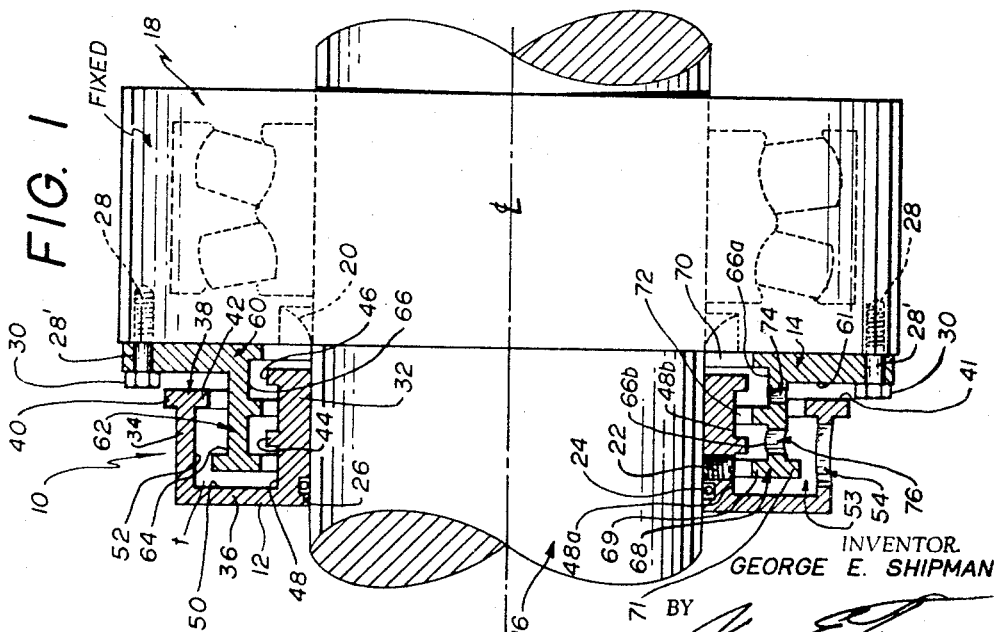
INVENTOR.
GEORGE E. SHIPMAN
BY
ATTORNEY 3,447,843
SEAL DEVICE
George Shipman, Ontario, Calif., assignor to Kaiser Steel Corporation, Oakland, Calif., a corporation of Nevada
Original application July 6, 1964, Ser. No. 380,434, now Patent No. 3,343,891, dated Sept. 26, 1967. Divided and this application Apr. 3, 1967, Ser. No. 644,042
Int. Cl. F16c *1/24, 33/72;* F16j *15/42*
U.S. Cl. 308—36.4                    4 Claims

ABSTRACT OF THE DISCLOSURE

An improved seal or guard device for use in closing the space between a shaft and a bearing assembly therefor wherein the improved seal or guard includes elements having uniquely arranged walls, ribs and flanges which provide a tortuous access path to the bearing assembly whereby entry of foreign material into the bearing assembly is inhibited.

---

This application is a division of my application Ser. No. 380,434 filed July 6, 1964, now Patent 3,343,891 granted on Sept. 26, 1967.

This invention relates to a guard or seal device for closing the space between a shaft and a bearing therefor and more particularly to an improved guard or seal device of unique shape which provides a tortuous access path to the bearing so as to prevent entry of foreign material into the bearing.

Accordingly, it is a primary purpose of the present invention to provide an improved guard or seal device for closing the space between a rotatable shaft and a bearing therefore wherein the unique shape of the improved guard or seal device comprises labyrinthical means for preventing the entry of foreign material into the bearing.

This and other purposes and advantages of the instant invention will become more apparent from a review of the following detailed description when taken in conjunction with the appended drawings, wherein:

FIGURE 1 is a longitudinal sectional view of a shaft and bearing having affixed thereto the improved guard or seal device of the present invention; and FIGURE 2 is a longitudinal sectional view of a casing having mounted therein a shaft and bearing which have affixed thereto a modified form of the improved guard or seal device of the present invention.

With further reference to the drawings and, in particular, FIGURE 1, a preferred embodiment of the improved guard or seal device 10 that can be used in carrying out the teachings of the instant invention, generally comprises a pair of uniquely shaped guard members 12 and 14 secured in a conventional fashion to a relatively rotatable shaft 16 and the bearing 18 disposed about the shaft 16 in a suitable manner. It is to be understood that the bearing 18 is a commercially available tapered roller bearing and further includes a conventional lip seal 20 mounted in a counter-bore at the forward end of the bearing. The annular members 12 and 14, making up the improved guard or seal device 10, are preferably made of metal or the like which is resistive to the action of foreign materials such as acid, alkali or other deleterious chemicals or debris to which the instant invention is subjected or exposed during use. The member 12 is provided with a concentric longitudinal bore for fixedly mounting the member 12 to the shaft 16 in a conventional fashion by the set screw 22 in FIGURE 1. To satisfactorily seal member 12 to the shaft 16 an O-ring 24 is employed and the O-ring 24 is mounted in a radial recess 26 in the bore of the member 12 in the manner illustrated in FIGURE 1. In order to affix the other member 14, preferably to the outer race of the bearing 18 a plurality of apertures 28' (only two of which are shown) extend longitudinally through the member 14 at the outer periphery whereby machine screws 30 can be passed through the apertures 28' in member 14 for connection with the aligned threaded openings 28 in the outer bearing race of the bearing 18. The members 12 and 14 of the improved guard or seal device 10 of the present invention are of such a unique construction that they not only close the space to the bearing but also provide a uniquely shaped tortuous path for preventing entry of foreign material to the bearing.

The unique shape of the annular member 12 is such that it includes a pair of parallel spaced annular wall portions 32 and 34 interconnected at one end by a third circular wall portion 36. The annular wall portion 32 of smaller diameter is the part of member 12 that has a longitudinal bore extending therethrough through which the shaft 16 protrudes. The cross-sectional length of the outer spaced wall portion 34 as indicated in FIGURE 1 is preferably of somewhat shorter length than that of wall 32. The free end of wall 34 contains a radially disposed flange 38 which includes inner and outer projections 40 and 42 with an outer radial surface 41 extending therebetween. A pair of annular rib portions 44 and 46 are provided on the outer circular surface 48 of the wall portion 32. It is to be observed here that the circular surface 48 is advantageously divided between the wall portion 36 and rib portions 44 and 46 into two cylindrical sections 48a and 48b which are preferably of identical length. The inner cylindrical surface 52 of the outer wall portion 34 along with the opposing cylindrical surface 48 and interconnecting annular surface 50 of wall portion 36 define a recess 53 the purpose of which will become more apparent hereinafter. In addition, a radially extending and preferably circular aperture 54 is provided in the outer spaced wall portion 34 in the fashion shown in FIGURE 1.

The other annular member 14 includes intersecting wall portions 60 and 62, preferably located at right angles to each other, such that wall portion 60 is of annular shape with its outer radial surface 61 opposite surface 41 while the other intersecting wall portion 62 is of general cylindrical shape. When the annular member 14 is affixed to the bearing 18 as aforedescribed the intersecting wall portion 62 is advantageously disposed to extend into the recess 53 defined by the other member 12 as appears in FIGURE 1. The diametrical and axial extent of the wall portion 62 is proportioned to leave sufficient clearance space between the surfaces 48, 50 and 52 of member 12 so that the tortuous passage *t* extends from its entry end at the radial extremity of the flange 38 to the lip seal 20 of the bearing 18. In other words, the outer cylindrical surface 64 and the inner cylindrical surface 66 of the wall portion 62 are disposed intermediate the oppositely facing surfaces 48 and 52 of the recess 53. Moreover, the free end of the intersecting wall portion 62 includes a flange 68 located opposite the wall portion 36. Flange 68 is provided with inner and outer radial projections 69 and 71. A pair of annular rib portions 70 and 72 divide the surface 66 into substantially identical cylindrical sections 66a and 66b. Moreover, the rib portions 70 and 72 as well as the flange projection 69 are advantageously longitudinally offset or interdigitated with respect to their oppositely disposed rib portions 44 and 46 on the other annular member 12 in such a manner that the flange projection 69 and rib portion 72 respectively overlie surfaces 48a and 48b while rib portion 70 beneficially overlies the radial passage between the lip seal 20 of the bearing 18 and the free end of wall portion 32.

In the operation of the embodiment of FIGURE 1 of the present invention it is to be understood that the shaft 16 is driven by suitable means (not shown) whereby the annular member 12 is preferably rotated relative to the other annular member 14 which is affixed to the bearing 18 as aforedescribed. It is noted here that radially extending apertures 74 and 76, preferably of different sizes relative to each other and both of which are smaller than the aperture 54, are provided in the wall portion 62 between the rib portions 70 and 72 and the flange 68 in the manner shown in FIGURE 1.

Whenever foreign material is directed onto the improved guard or seal device 10, the unique tortuous path t extending between the opposed aforedescribed surfaces of the members 12 and 14 advantageously functions in the maner of a catch basin to prevent entry of foreign material into the the bearing by effective removal of foreign material from the tortuous path prior to entrance of the same into the bearing. The outer flange projection on rotatable member 12 collects an advantageously directs foreign material outwardly to initially prevent entry of the foreign material into the tortuous path. For instance during rotation of member 12 foreign material along surfaces 50 and 52 is entrapped against the flange projection 42 for eventual drainage through the aperture 54 by the effect of centrifugal force. The sectional surfaces 48a and 48b encourage entrapment of the foreign material therealong while rib portions 44 and 46 encourage eventual transfer of the entrapped fluid on the surfaces 48a and 48b by the effect of centrifugal force to the oppositely disposed sectional surfaces 66a and 66b on the fixed member 14. The rib portions 70 and 72 as well as the flange projection 69 on the fixed wall portion 62 also aid in entrapping the foreign material collected on the sectional surfaces 66a and 66b for eventual drainage through the apertures 74 and 76 as the case may be by the effect of gravity to the opposed surface 64 of the fixed member 14. Collection of foreign material on the surface 64 is encouraged by drippage off the flange projection 71 onto the rotatable surface 52 for eventual removal through the aperture 54 as aforedescribed. In addition, radial surface 61 on wall portion 60 contributes to the removal of foreign material collected on the surface 64. It is to be further noted that even when the rotatable member 12 is stationary that whenever foreign material is directed onto the improved device 10 drainage of foreign material will effectively occur through the apertures 54, 74 and 76 and, therefore, for all practical purposes the device 10 effectively prevents foreign material from entering into the bearing 18.

Referring to FIGURE 2 a modified form of an improved guard or seal device 80 that can be used in carrying out the teachings of the instant invention generally comprises a pair of similarly shaped annular members 82 and 84. Annular member 84 is affixed to the outer race of a bearing 86 and a casing 88 by means of a split anchoring ring 90, and an O-ring 92 in a conventional manner. The other annular member 82 has a longitudinal concentric bore therethrough for connection of the member 82 to the shaft 96 at its reduced end 99 by means of a split ring 94 in a conventional manner. The inner race of the bearing 86 is also mounted on the shaft 96 inwardly of the reduced end 99 in the manner shown in FIGURE 2.

The annular member 82 comprises a pair of intersecting wall portions 98 and 100 which intersect preferably at right angles to each other and are expediently disposed outside of the member 84. The free end of the wall portion 100 includes an annular flange 102 provided with inner and outer frusto-conical and convergent surfaces 104 and 106. The inner cylindrical surface 108 of wall portion 100 is advantageously divided as shown in FIGURE 2 into two cylindrical sections 108a and 108b of different lengths by an intermediate annular rib portion 110. This rib portion 110 includes two spaced annular surfaces of different radial extent extending inwardly from surface 108 in such a manner that the inner radial ends of the spaced annular surfaces are interconnected by a frusto-conical surface 109 as indicated in FIGURE 2.

The inner radial surface 112 of the wall portion 98 which opposes the other member 84 includes a series of substantially identical annular axial depressions which are beneficially disposed at different radial sections of the surface 112. Oppositely facing surfaces of each depression which project from the surface 112 comprise parallel frusto-conical surfaces which are interconnected at their inward extremity by the body of element 82. These frusto-conical surfaces are inclined toward the axis of the shaft 96 for a purpose to be hereinafter described. These depressions 114 advantageously divide the surface 112 into different sized annular ribbed sections 116 and 118 of different lengths as shown in FIGURE 2.

The other annular member 84 includes a pair of spaced radial wall portions 120 and 122 interconnected by a cylindrical wall portion 124. The radial extent of wall portion 120 is preferably greater than that of wall portion 122 whereby the free end of the wall portion 122 is advantageously disposed radially inward of the intersecting wall portion 100 of the other member 82 in the manner shown. The outer radial end of the wall portion 122 includes a circumferential flange 126 which projects axially inward. The cylindrical wall portion 124 is sufficiently spaced from the shaft 96 to define a longitudinal chamber c which extends between the inner cylindrical surface 125 of wall portion 124 and the outer surface of the shaft 96. The outer peripheral surface of the flange 126 includes a pair of axially disposed annular depressions 128. Cylindrical surfaces of each depression 128 are interconnected at opposed ends thereof by opposed intersecting frusto-conical surfaces that converge radially outward while each cylindrical surface at the other ends are connected to the associated radial surface 142 and 143 as the case may be by a frusto-conical surface that converges radially outward to intersect with the associated radial surface 142 or 143. Thus, the intersecting frusto-conical surfaces of the annular depressions 128 define annular rib portions 130 on the flange 126.

Oppositely facing radial surfaces 132 and 134 of the wall portions 120 and 122 are interconnected by the cylindrical surface 136 of wall portion 124. The inner cylindrical surface 138 of the flange 126 as well as the surfaces 132, 134 and 136 define an annular recess 140 that communicates with a radially outward disposed opening that extends between the surfaces 143 and 132.

The annular radial surface 142 on wall portion 122 which opposes surface 112 on the other member 82 includes a pair of identical axial annular depressions 144 that divide radial surface 142 into a series of annular sections or ribs. Each of these annular depressions includes oppositely facing parallel frusto-conical surfaces that extend from the surface 142 to be interconnected at their inward extremity by the inner radial annular surface of the depresison 144. The frusto-conical surfaces of the depressions 144 are inclined as well as radially offset with respect to the depressions 114 on the surface 112 of the other member 82 for purposes to be hereinafter described. It is to be observed here that the radial ends of the annular surface 142 in conjunction with the pair of intermediate depressions 144 advantageously divide the surface 142 into a series of preferably three annular sections of different radial extent. Thus, these three annular sections along with the depressions 144 can be said to define annular rib portions 146, 147 and 148 which are radially offset with respect to the rib portions 116 and 118 on member 82.

The outer cylindrical surface 152 of the intersecting wall portion 100 extends from the outer end of the frusto-conical surface 106 of the flange 102 to a frusto-conical surface 154 that converges radially inward to the outer radial surface 156 of the other intersecting wall portion 98. The casing or roll body 88 advantageously includes a frusto-conical surface 158 that extends from the split ring 90 to the outer radial end surface 88a of the roll body 88. The surface 158 can be advantageously inclined axially outward toward the surface 88a. The surface 158 at the free end of the body 88 is further modified to include an annular rib portion 160 defined by the axial annular depression 162' as indicated in FIGURE 2.

To operate the modified form of the instant invention, in contrast to FIGURE 1, the roll body 88 as well as the outer race of the bearing 86 are rotatably driven by conventional means not shown while the shaft 96 and inner race of the bearing 86 are fixed. Thus, rotation of the roll body 88 provides corresponding rotation of the annular member 84 while the other annular member 82 remains fixed in view of the fixed shaft 96. It is to be observed here that the counter-bore 160' at the inner axial end of the annular member 84 can have a lip seal such as the lip seal 20 of FIGURE 1 mounted thereon. The fixed member 82 has a radial aperture 162 extending through its wall portion 100. Aperture 162 is advantageously positioned at the lowermost position of the fixed annular member 82 to facilitate drainage of foreign material from the tortuous passage t' by the effect of gravity.

Whenever foreign material is directed by pressure towards the entrance end of the tortuous passage, it is initially deflected away by the frusto-conical surface 154 of the fixed member 82 in cooperation with the rotating frusto-conical surface 158 of the rotating roll body 88. Annular rib portion 160 at the outer free end of the frusto-conical surface 158 aids in collecting as well as discharging the foreign material outwardly due to the effect of centrifugal force when the roll body 88, is being rotatably driven.

If foreign material enters the tortuous path t' between the relatively moving members 82 and 84, the surfaces 132, 134, 136 and 138 of the recess 140 encourage collection and entrapment of the foreign material prior to its being discharged outwardly by the effect of centrifugal force either between the flange 102 and the radial surface 132 or it is entrapped by inner surfaces 104 and 108a of the wall portion 100. Foreign material along the outer surface of the flange 126 and the surface 142 is entrapped by the radial rib portions 130 and 146 to 148 prior to being discharged outwardly by the effect of centrifugal force against the inner surfaces 104 and 108 of the intersecting wall portion 100. Foreign material assimilated by the fixed surface 112 is collected in the depressions 114 of the rib portions 116 and 118 for eventual drippage to the surface 108b by the effect of gravity. The inclination of the depressions 114 on the surface 112 as well as the inclination of the depressions 144 on the surface 142 discourage flow of the foreign material toward the annular chamber between the surface 125 and the shaft 96. All entrapped foreign material regardless of whether or not the member 84 is rotating, is effectively removed through the aperture 162 by the effect of gravity. The rib portion 110 advantageously divides the entrapped foreign material between sectional surfaces of surface 108 so that the foreign material can be effectively drained through the aperture 162.

Thus, it is readily apparent that the aforedescribed embodiments in FIGURES 1 and 2 can be advantageously employed to close the spacing between a bearing and a shaft regardless of whether or not the shaft is rotating or fixed as aforedescribed.

From the above description it will be obvious to those skilled in the art that various changes and modifications may be made in the various embodiments of the instant invention without departing from the spirit and scope thereof as set forth in the appended claims, wherein:

What is claimed is:

1. In an apparatus including bearing means and a shaft rotatably mounted in the bearing means and with a space being provided between said bearing means and said shaft, a device for sealing said space comprising first and second annular members, said first member including a pair of opposing and spaced wall portions interconnected by a further wall portion, said second member including intersecting wall portions, one of said spaced wall portions of said first member being affixed to said bearing means and one of said intersecting wall portions of said second member being affixed to said shaft in such fashion as not to interfere with the relative movement between said first and second members, the said wall portions of said first member defining a recess, one of the intersecting wall portions of said second member being disposed outwardly of and in spaced relation to one of the wall portions of said first member in such fashion as to partially extend across the recess in said first member and thereby partially define a tortuous path to said bearing means, said tortuous path being further defined by a series of ribs and flanges on the directly opposing surfaces of both the first and second annular members, the ribs and a flange on the first member also being offset with respect to the ribs and a flange of said second member, the said flange of said first member being disposed on the free end of one of the spaced wall portions thereof and the said flange of the second member being disposed on the free end of an intersecting wall portion thereof and the above formed tortuous path being adapted to minimize the entry of foreign material into said bearing means by the effect of gravity and centrifugal force during relative movement of said annular members.

2. A device as set forth in claim 1 wherein the ribs on both said first and second members include frusto-conical surfaces to facilitate removal of the foreign material.

3. A device as set forth in claim 1 wherein the bearing means is further associated with a casing, and wherein the casing and the second member have opposed surfaces which converge in the direction of the entry to the tortuous passage between the first and second members to further minimize entry of foreign material in the tortuous passage.

4. A device as set forth in claim 1 wherein said second member also has an aperture in one of the wall portions thereof.

References Cited

UNITED STATES PATENTS

| 1,145,516 | 7/1915 | Schmid-Roost | 508—36.4 |
| 1,806,515 | 5/1931 | Zoelly | 377—57 XR |

FOREIGN PATENTS

| 452,314 | 8/1936 | Great Britain. |
| 698,729 | 10/1953 | Great Britain. |

MARTIN P. SCHWADRON, *Primary Examiner.*

FRANK SUSKO, *Assistant Examiner.*

U.S. Cl. X.R.

308—187.1